Figure 1:
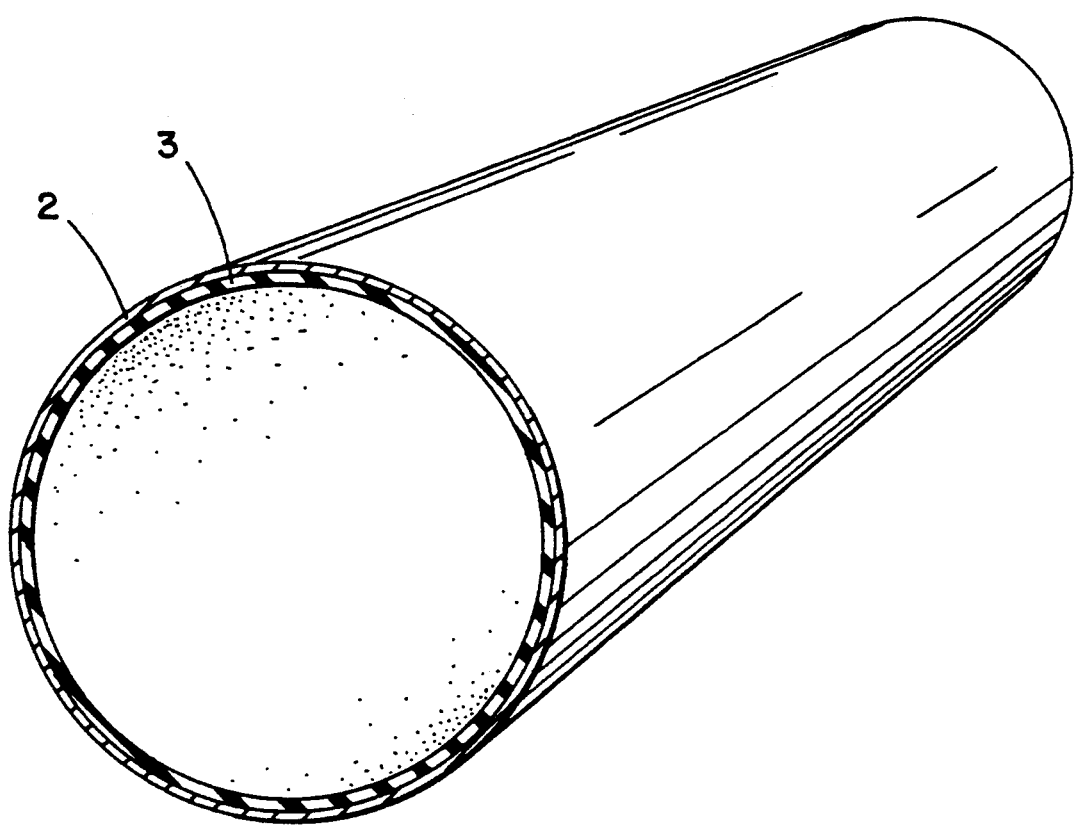

United States Patent [19]

Forste et al.

[11] Patent Number: 5,280,083
[45] Date of Patent: Jan. 18, 1994

[54] METHOD OF FORMING A STABILIZED VULCANIZATE OF CHLORO RUBBERS AND SAID VULCANIZATE

[75] Inventors: Carol L. Forste, Clinton; Mervin V. Pilkington, Akron, both of Ohio

[73] Assignee: The Goodyear Tire & Rubber Company, Akron, Ohio

[21] Appl. No.: 923,659

[22] Filed: Aug. 3, 1992

[51] Int. Cl.$^5$ ................................................ C08F 8/00
[52] U.S. Cl. ...................................... 525/369; 525/361; 525/362; 525/363; 524/436; 524/437
[58] Field of Search ............ 525/369, 361, 362, 363; 524/436, 437

[56] References Cited

U.S. PATENT DOCUMENTS

| | | | |
|---|---|---|---|
| 4,284,762 | 8/1981 | Miyata et al. | 528/485 |
| 4,379,882 | 4/1983 | Miyata | 524/436 |
| 4,547,620 | 10/1985 | Miyata et al. | 585/852 |
| 4,558,102 | 12/1985 | Miyata | 525/348 |
| 4,675,356 | 6/1987 | Miyata | 524/424 |

*Primary Examiner*—Paul R. Michl
*Assistant Examiner*—Edward Cain
*Attorney, Agent, or Firm*—Marc R. Dion, Sr.; J. D. Wolfe

[57] ABSTRACT

Calcium aluminum hexahydrate is a useful curative-stabilizer for halogenated rubbers such as chloronated polyethylene, chlorosulfonated polyethylene and polychloroprene as it can yield vulcanizates free of leachable lead. Also, these vulcanizates with about 1 to about 30 or more parts with about 3 to about 15 parts calcium aluminum hexahydrate being highly desirable give satisfactory to improved heat ageing properties as well as oil ageing properties.

12 Claims, 1 Drawing Sheet

METHOD OF FORMING A STABILIZED VULCANIZATE OF CHLORO RUBBERS AND SAID VULCANIZATE

FIELD

This invention relates to an improved method to vulcanize or cure halogenated rubbers and to the resulting vulcanizates. By this method, the halogenated rubbers are vulcanized with an activator or activators to give a vulcanizate free of poisonous lead and having physical properties essentially equal to lead vulcanizates. More specifically, this invention relates to a vulcanizate of a halogenated rubber containing from 1 to about 30 and higher parts of calcium aluminum hexahydrate.

BACKGROUND OF THE INVENTION

Halogenated rubbers such as chlorosulfonated polyethylene and chlorinated polyethylene require activators to aid in curing the rubber and to stabilize the cured rubber. In the case of chlorosulfonated polyethylene and chlorinated polyethylene rubbers, metal oxides, and hydroxides of lead, cadmium, magnesium, calcium and barium have been used as activators and stabilizers. Toxicity concerns have decreased the use of barium, cadmium and lead which leaves calcium and magnesium as the most common stabilizer. These are known to be moisture sensitive and cause water absorption and are very unsatisfactory for producing vulcanizates for tank linings.

In the case of polychloroprene rubber, oxides of zinc and magnesium and lead are commonly used to activate the cure and stabilize the vulcanizate. Zinc is known to produce moisture sensitivity, resulting in water absorption. In cases where water immersion is needed, lead oxides are preferred in place of zinc oxide and magnesium oxide. Landfill requirements require a limited lead content in acidic leachate tests and lead stabilized polymers are recognized as a disposal problem. Consequently, a need exists for an improved curative-stabilizer for the halogenated rubber vulcanizates other than lead salts.

FIG. 1 is a cross-sectional view through the tank 2 of a tank truck showing the Neoprene lining 3 cured with calcium aluminum hexahydrate.

The halogen-containing rubbers used in this invention are known and can be properly selected. Examples include halogen-containing olefin rubbers such as chlorinated polyethylene rubber, chlorinated polypropylene rubber, chlorosulfonated polyethylene rubber, chlorinated ethylene/propylene rubber, chlorinated ethylene/propylene/diene rubber, chlorinated ethylene/1-butene rubber, chlorinated ethylene/4-methylpentene rubber, chlorinated butyl rubber, and epihalohydrin rubbers such as polyepichlorohydrin rubber, epichlorohydrin/ethylene oxide copolymer rubber and epichlorohydrin/allyl glycidyl ether copolymer rubber, fluorine rubbers; chlorine-containing and polychloroprene rubbers.

We have discovered that the use of calcium aluminum hexahydrate in the curing recipes for halo rubbers yields vulcanizates with improved stabilizing effects in heat ageing, oil ageing and hydraulic fluid ageing relative to the vulcanizates of halo rubbers cured with a recipe containing the industry's best curative, lead oxide. This, indeed, is an important discovery in view of the fact lead oxide vulcanizates present a disposal problem due to the problem of ground water contaminated by extracted lead. Further, these improved properties of the invention vulcanizates make these invention vulcanizates desirable for use in making Freon hose, hydraulic hose as well as gaskets, seals and other industrial products like underground cable coating and tank linings.

Synthetic crystalline calcium aluminum hexahydrate produces a high state of cure in polychloroprene rubbers while eliminating the stabilizer lead oxide or magnesium oxide/zinc oxide combination. Hence, if the harmful effects of environmental contamination by lead forces lead's replacement, the instant invention would be preferred for a replacement for lead with advantages in heat ageing, oil ageing and hydraulic fluid ageing.

The useful calcium aluminum hexahydrate is also called tri-calcium aluminate hexahydrate with the formula $Ca_3Al_2(OH)_{12}$ and is available from the Huber Corporation.

The calcium oxide and calcium and magnesium salts of the organic acids, for instance, phthalic acids, and specifically terephthalic acid are useable to advantage in curing and producing these vulcanizates with calcium aluminum hexahydrate.

The BET specific surface area of the compound of the above formula may be properly chosen, and is preferably about 20 to about 100 $m^2/g$. The particle diameter of the compound of the formula is preferably small to obtain good dispersibility in a rubber material. For example, it has a secondary particle diameter of about 0.1 to about 10 microns.

The curative product of the stabilized formula used in this invention can have specific surface area, for example, about 20 to about 300 $m^2/g$, preferably about 20 to about 200 $m^2/g$, and a particle diameter of about 0.1 to about 10 microns.

The curable rubber composition may contain various compounding agents known in the art such as fillers, reinforcing agents, plasticizers, processing aids, cross-linking agents, antioxidants, pigments and fire retardants. These compounding agents may be used in amounts generally known in the art. For examples, the amounts may be about 5 to about 200 phr for the fillers, about 5 to about 150 phr for the reinforcing agents, about 1 to about 20 phr for the plasticizers, about 1 to about 10 phr for the processing aids, about 0.1 to about 10 phr for the cross-linking agents, about 0.1 to about 10 phr for the antioxidants, about 0.1 to about 10 phr for the pigments and about 1 to about 200 phr for the fire retardants, each based on the weight of the one hundred parts of halogen-containing rubber.

Examples of the fillers include carbon black, silicic anhydride, hydrous silicic acid, calcium silicate, aluminum silicate, clay, talc, calcium carbonate, basic magnesium carbonate, alumina hydrate, diatomaceous earth, barium sulfate, mica, alumina sulfate, lithopone, asbestos and graphite.

Examples of the reinforcing agents include high-styrene resins, coumarone-indene resin, phenolic resins, modified melamine resins, petroleum resins, lignin, cotton, rayon, nylon, Vinylon, polyesters, glass fibers, carbon fibers and steel cords.

Examples of the plasticizers include pine tar, tall oil, rapeseed oil, cottonseed oil, peanut oil, castor oil, palm oil, mineral oil-type softeners, phthalic acid derivatives (e.g., DBP, DHP, DOP, and DIDP), sebacic acid derivatives such as DES and DOS and adipic acid derivatives (such as DOA and DIOA).

Examples of the processing aids include Struktol WB212 (a mixture of high-molecular-weight fatty acid esters) and RP-10 (dixylyl disulfide mixture); and rubber hardening agents such as benzidine, p-aminophenol and p-phenylenediamine.

Examples of the pigments include titanium white, lithopone, zinc sulfide, cadmium red, cadmium yellow, barium yellow, strontium yellow, chrome yellow, ultramarine, Prussian blue, cobalt blue, chromium oxide, cobalt green, carbon black, Hansa Yellow G, Lake Red C, benzidine orange, phthalocyanine blue, and phthalocyanine green.

Examples of the fire retardants include aluminum hydroxide, magnesium hydroxide, antimony trioxide, tetrabromobisphenol A, chlorinated paraffin, tricresyl phosphate, triethyl phosphate, perchloropentacyclodecane and chlorinated polyphenyl.

To further illustrate and exemplify the invention, a number of chloronated rubbers were compounded and tested. In a clean cold banbury, the compounding ingredients listed in Tables 1 and 3 below were mixed in the amounts by weight until the mixture in the banbury reach 180° F. and then mixed an additional minute after the accelerator and the acid scavenger was added and the mixture was dropped from the banbury when the temperature reached 260° F.

The nature of these mixes is shown in Tables 1 and 3 and the properties of their vulcanizates is shown in Tables 2 and 4.

The chlorosulfonated polyethylene compositions were cured at 310° F. for a time equal to the Rheometer T90 plus 10%. The polychloroprene compositions were cured at 300° F. for a time equal to the Rheometer T90 plus 10%.

Table 1 of Recipes

| Ingredients | A | B | C | D |
|---|---|---|---|---|
| Chlorosulfonated polyethylene | 100 | 100 | 100 | 100 |
| Carbon black | 75 | 75 | 75 | 75 |
| PEG* | 3 | 3 | 3 | 3 |
| PE wax | 3 | 3 | 3 | 3 |
| TOTM | 15 | 15 | 15 | 15 |
| Litharge | 10 | | | |
| Lime (CaO) | | 10 | | |
| Mg (OH)$_2$ | | | 10 | |
| Calcium aluminum hexahydrate | | | | 10 |
| Curative | 3.5 | 3.5 | 3.5 | 3.5 |
| Totals | 209.50 | 209.50 | 209.50 | 209.50 |
| Sp. Gr. | 1.382 | 1.358 | 1.362 | 1.363 |

*PEG designates a polyethylene glycol of varying molecular weight or a wax of the PEG type.

TABLE 2

Tests and Properties of the Vulcanizates of the Recipes of Table 1

| Tests | Recipe Designation | | | |
|---|---|---|---|---|
| Rheometer 310F | A | B | C | D |
| T90 | 32.5 | 40.2 | 41.3 | 31.0 |
| Amount | 41.9 | 46.8 | 34.3 | 41.9 |
| Rate | 1.19 | 1.00 | .81 | 1.71 |
| Original Vulcanizate Properties | | | | |
| Tensile | 2450 | 2598 | 1798 | 2052 |
| Elongation | 138 | 132 | 168 | 113 |
| Shore A Hardness | 77 | 80 | 80 | 84 |
| Tear | 167 | 183 | 170 | 154 |
| Compression Set at 7 Hours @ 250° F. | | | | |
| % Set | 35 | 48 | 43 | 33 |
| Compression Set at 72 Hours @ 300° F. | | | | |
| % Set | 56 | 73 | 63 | 56 |
| Oven-Aged for 7 Days @ 250° F. | | | | |
| Tensile | 2253 | 2521 | 1999 | 1950 |
| % Retained Tensile | 92 | 97 | 111 | 95 |
| Elongation | 116 | 113 | 137 | 102 |
| % Retained Elongation | 84 | 86 | 82 | 90 |
| Shore A | 85 | 87 | 84 | 83 |
| Point Change | 8 | 7 | 4 | 1 |
| Oven Aged for 7 Days @ 300° F. | | | | |
| Tensile | 1295 | 1529 | 1487 | 1433 |
| % Retained Tensile | 53 | 59 | 83 | 70 |
| Elongation | 29 | 30 | 23 | 43 |
| % Retained Elongation | 21 | 23 | 14 | 38 |
| Shore A Hardness | 94 | 94 | 96 | 93 |
| Point Change | 17 | 14 | 16 | 9 |
| Oil Ageing ASTM No. 3 Test for 70 Hours @ 250° F. | | | | |
| Tensile | 1670 | 1842 | 1136 | 1475 |
| % Retained Tensile | 68 | 71 | 63 | 72 |
| Elongation | 94 | 103 | 108 | 85 |
| % Retained Elongation | 68 | 78 | 64 | 75 |
| Shore A | 64 | 63 | 60 | 65 |
| Point Change | −13 | −17 | −20 | −19 |
| Volume Change | +47 | +45 | +54 | +45 |
| Oil Ageing ASTM No. 3 Test for 70 Hours @ 300 F | | | | |
| Tensile | 1455 | 1637 | 1061 | 1351 |
| % Retained Tensile | 59 | 63 | 59 | 66 |
| Elongation | 83 | 100 | 104 | 81 |
| % Retained Elongation | 60 | 76 | 62 | 72 |
| Shore A | 61 | 62 | 54 | 65 |
| Point Change | −16 | −18 | −26 | −19 |
| Volume Change | +49 | +44 | +57 | +47 |
| Exxon FN 1973 Test Immersion for 70 Hours @ 300 F | | | | |
| Tensile | 1675 | 1650 | 1319 | 1621 |
| % Retained Tensile | 68 | 64 | 73 | 79 |
| Elongation | 86 | 75 | 94 | 81 |
| % Retained Elongation | 62 | 57 | 56 | 72 |
| Shore A | 71 | 72 | 68 | 72 |
| Percent Change | −6 | −8 | −12 | −12 |
| Volume Change | +21 | +18 | +23 | +20 |

Recipes of Table 3

| Recipe Ingredients | Compounds | | | |
|---|---|---|---|---|
| | E | F | G | H |
| Polychloroprene | 100 | 100 | 100 | 100 |
| Polybutadiene Rubber | 5.0 | 5.0 | 5.0 | 5.0 |
| Carbon Black | 44.0 | 44.0 | 44.0 | 44.0 |
| Dibutylphthalate | 15.0 | 15.0 | 15.0 | 15.0 |
| Octamine | 2.0 | 2.0 | 2.0 | 2.0 |
| Stearic Acid | .5 | .5 | .5 | .5 |
| MBTS | 1.0 | 1.0 | 1.0 | 1.0 |
| Red Lead | 15.0 | | | |
| Calcium Aluminum Hexahydrate | | 15.0 | 7.5 | 7.5 |
| Ca(OH)$_2$ | | | 7.5 | |
| Magnesium Terephthalate | | | | 7.5 |
| Total | 182.10 | 182.10 | 182.10 | 182.10 |
| Sp. Gr. | 1.397 | 1.355 | 1.352 | 1.331 |

TABLE 4

Tests and Properties of the Vulcanizates of the Recipes of Table 1

| Rheometer 300° F. | E | F | G | H |
|---|---|---|---|---|
| T90 | 34.7 | 29.6 | 26.5 | 16.2 |
| Amount | 31.9 | 34.8 | 42.1 | 32.9 |
| Rate | .73 | 1.17 | 1.66 | 2.56 |
| Original Properties | | | | |
| Tensile | 2206 | 2415 | 2318 | 1882 |
| Elongation | 602 | 423 | 404 | 639 |
| Modulus 300% | 985 | 1597 | 1647 | 776 |
| Shore A | 52 | 64 | 65 | 53 |

TABLE 4-continued

Tests and Properties of the Vulcanizates of the Recipes of Table 1

| Rheometer 300° F. | E | F | G | H |
|---|---|---|---|---|
| Heat Ageing for 70 Hours @ 212° F. | | | | |
| Tensile | 2922 | 2437 | 2092 | 2136 |
| % Retained Tensile | 132 | 101 | 90 | 113 |
| Elongation | 433 | 337 | 286 | 339 |
| % Retained Elongation | 72 | 80 | 71 | 53 |
| Shore A | 65 | 67 | 73 | 70 |
| Point Change | 13 | 3 | 8 | 17 |
| ASTM No. 3 Oil Ageing for 70 Hours @ 212° F. | | | | |
| Tensile | 1324 | 1047 | 1114 | 559 |
| % Retained Tensile | 60 | 43 | 48 | 30 |
| Elongation | 303 | 282 | 275 | 297 |
| % Retained Elongation | 50 | 67 | 65 | 46 |
| Shore A Hardness | 73 | 97 | 98 | 85 |
| Point Change | 21 | 33 | 33 | 32 |
| Volume Change | +89.9 | +97.0 | +101.0 | +151.3 |
| Compression Set 72 Hours @ 212° F. | | | | |
| % Set | 88 | 82 | 84 | 94 |

While certain representative embodiments and details have been shown for the purpose of illustrating the invention, it will be apparent to those skilled in this art that various changes and modifications may be made therein without departing from the spirit or scope of the invention.

What is claimed is:

1. In a method for curing a curable rubber composition composed of a halogen containing rubber and a member selected from the group consisting of a vulcanizing agent and a vulcanization accelerator under heat in the presence of an acid acceptor, the improvement wherein said acid acceptor composition is calcium aluminum hexahydrate of the formula

$Ca_3Al_2(OH)_{12}$.

2. The method of claim 1 wherein the vulcanized halogenated rubber is selected from the class consisting of polychloroprene, chlorosulfonated polyethylene rubber and chlorinated polyethylene rubber.

3. The method of claim 1 wherein the amount of the acid acceptor is present in about 1 to about 30 parts per hundred of rubber.

4. The method of claim 1 wherein the vulcanizate contains in addition to the acid acceptor, calcium aluminum hexahydrate about 1 to 25 parts per hundred of rubber (phr) of a stabilizer selected from the class consisting of MgO, CaO, Ca(OH)$_2$, Mg(OH)$_2$ and calcium or magnesium salt of an organic acid.

5. The method of claim 1 wherein the halogen-contain rubber is cured at about 175° F. to about 350° F.

6. A vulcanized halogenated rubber selected from the group consisting of polychloroprene, chlorosulfonated polyethylene rubber and chlorinated polyethylene containing a curative-stabilizer, calcium aluminum hexahydrate.

7. The vulcanized halogenated rubber of claim 6 wherein the curative-stabilizer is present in about 1 to about 30 parts per hundred of rubber.

8. The vulcanizate of claim 6 wherein the vulcanizate contains in addition to the curative stabilizer, calcium aluminum hexahydrate, about 1 to about 25 parts per hundred of rubber (phr) of at least one stabilizer selected from the group consisting of MgO, CaO, Ca(OH)$_2$, Mg(OH)$_2$ and a calcium or magnesium salt of an organic acid.

9. A method of producing cured synthetic resins containing halogens and/or acidic substances having improved heat resistance, color, and heat aging properties, comprising mixing said synthetic resin containing halogen and/or acidic substance with calcium aluminum hexahydrate of the formula $Ca_3Al_2(OH)_{12}$ to form a mixture and heating said mixture at a temperature to effect cure of said resin.

10. The method of claim 9 wherein the mixture is heated at about 175° F. to about 350° F.

11. An improved heat resistance, color retention and water resistant vulcanized halogened rubber selected from the group consisting of polychloroprene, chlorosulfonated polyethylene rubber and chlorinated polyethylene containing a curative-stabilizer of calcium aluminum hexahydrate having the formula $Ca_3Al_2(OH)_{12}$.

12. The vulcanizate of claim 11 wherein the vulcanizate contains in addition to the curative stabilizer, calcium aluminum hexahydrate, about 1 to about 25 parts per hundred of rubber (phr) of at least one stabilizer selected from the group consisting of MgO, CaO, Ca(OH)$_2$, Mg(OH)$_2$ and a calcium or magnesium salt of an organic acid.

* * * * *